US011501075B1

(12) United States Patent
Pandey et al.

(10) Patent No.: US 11,501,075 B1
(45) Date of Patent: Nov. 15, 2022

(54) SYSTEMS AND METHODS FOR DATA EXTRACTION USING PROXIMITY CO-REFERENCING

(71) Applicant: FMR LLC, Boston, MA (US)

(72) Inventors: Abhinav Pandey, Bareilly (IN); Praveen Narayanasamy, Bangalore (IN); Kaustubh Ajgaonkar, Bangalore (IN); Gunjan Narulkar, Bangalore (IN); Ankur Jaiswal, Yavatmal (IN)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 17/365,084

(22) Filed: Jul. 1, 2021

(51) Int. Cl.
| | |
|---|---|
| *G06F 40/10* | (2020.01) |
| *G06F 40/295* | (2020.01) |
| *G06K 9/62* | (2022.01) |
| *G06F 16/33* | (2019.01) |
| *G06F 40/216* | (2020.01) |

(52) U.S. Cl.
CPC ........ *G06F 40/295* (2020.01); *G06F 16/3334* (2019.01); *G06F 40/216* (2020.01); *G06K 9/6215* (2013.01)

(58) Field of Classification Search
CPC ...... G06F 40/295; G06F 40/30; G06F 16/355; G06F 16/986; G06F 16/81; G06F 16/288; G06F 40/205; G06F 16/244; G06F 16/3344; G06F 16/9577; G06F 40/284; G06F 40/10; G06F 16/285; G06F 40/20
See application file for complete search history.

(56) References Cited

U.S. PATENT DOCUMENTS

| | | | | |
|---|---|---|---|---|
| 8,325,974 | B1* | 12/2012 | Killalea | G06F 16/24578 382/100 |
| 9,043,197 | B1* | 5/2015 | Pasca | G06F 40/284 704/10 |
| 9,514,098 | B1* | 12/2016 | Subramanya | G06F 40/284 |
| 9,639,518 | B1* | 5/2017 | Goodspeed | G06F 40/295 |
| 10,776,579 | B2 | 9/2020 | Mishra et al. | |
| 11,023,681 | B2* | 6/2021 | Lassoued | G06F 16/367 |
| 2007/0067285 | A1* | 3/2007 | Blume | G06Q 10/10 707/999.005 |
| 2011/0295593 | A1* | 12/2011 | Raghuveer | G06Q 10/10 704/9 |

(Continued)

OTHER PUBLICATIONS

Chen et al., "SinoCoreferencer: An End-to-End Chinese Event Coreference Resolver", 2014, InLREC May 2014 (vol. 2, p. 1-7).*

*Primary Examiner* — Olujimi A Adesanya
(74) *Attorney, Agent, or Firm* — Cesari & McKenna, LLP (57) ABSTRACT

Systems and methods for extracting data from unstructured data sources based on proximity co-reference resolution model. The method includes receiving an electronic document from an unstructured data source and extracting entities from the electronic document. The method also includes receiving fields to be extracted from the electronic document and generating keywords based on the fields. Each of the entities is associated with at least one of the fields. The method further includes identifying keywords in the electronic document based on the generated keywords and calculating, for each of the fields, proximity scores based on a proximity co-reference resolution model. The method also includes, for each of the fields, identifying a field-entity pair based on the calculated proximity scores and generating for display on a user device the field-entity pair.

14 Claims, 11 Drawing Sheets

(56) References Cited

U.S. PATENT DOCUMENTS

| | | | |
|---|---|---|---|
| 2012/0210203 A1* | 8/2012 | Kandekar | G06F 15/0291 |
| | | | 715/230 |
| 2013/0151954 A1* | 6/2013 | Lerullo | G09B 5/02 |
| | | | 715/254 |
| 2013/0191329 A1* | 7/2013 | Dozier | G06F 16/215 |
| | | | 707/609 |
| 2013/0311467 A1* | 11/2013 | Galle | G06F 40/247 |
| | | | 707/737 |
| 2017/0060837 A1* | 3/2017 | Dusberger | G06F 16/35 |
| 2018/0330231 A1 | 11/2018 | Gu et al. | |
| 2019/0026361 A1* | 1/2019 | Doh | G06F 16/3344 |
| 2020/0265054 A1* | 8/2020 | Summers | G06F 16/285 |
| 2020/0265114 A1 | 8/2020 | Beller et al. | |
| 2021/0182548 A1* | 6/2021 | Ayyadevara | G06V 20/62 |
| 2021/0264208 A1* | 8/2021 | Damodaran | G06N 5/022 |

* cited by examiner

Transaction Summary

320

| TERMS | |
|---|---|
| Issuer: | Financial Organization |
| Index: | Asset Index |
| Trade Date: | Expected to be April 30, 2018 |
| Settlement Date (set on the trade date): | Expected to be May 3, 2018 |
| Determination Date (set on the trade date): | Expected to be May 1, 2023 |
| Stated Maturity Date (set on the trade date): | Expected to be May 4, 2023 |
| Initial Index Level: | To be determined on the trade date |
| Final Index Level: | The closing level of the index on the determination date |
| Upside Participation Rate (set on the trade date): | Expected to be between 270% and 290% |
| Index Return: | The *quotient* of (i) the final index level *minus* the initial index level *divided by* (ii) the initial index level, expressed as a percentage |
| Payment Amount: | On the stated maturity date we will pay you, for each $1,000 face amount of your CDs, an amount in cash equal to the *sum of $1,000 plus the* supplemental amount |
| Supplemental Amount: | For each $1,000 face amount of the CDs. <br>• if the index return is *positive* (the final index level is *greater than* the initial index level), the product of (i) $1,000 times (ii) the upside participation rate times (iii) the index return, or <br>• if the index return is zero or *negative* (the final index level is *equal to or less than* the initial index level), $0 |

FIG. 6A

| Entity Value | Type | Paragraph | Start Position | End Position |
|---|---|---|---|---|
| 03-Apr-18 | DATE | 1 | 29 | 42 |
| May 4, 2023 | DATE | 4 | 112 | 123 |
| 19-Dec-11 | DATE | 70 | 98 | 115 |
| Financial Organization | ORG | 17 | 40 | 62 |
| The Financial Organization | ORG | 17 | 107 | 136 |
| Financial Corporation | ORG | 20 | 210 | 248 |
| 2023 | CARDINAL | 3 | 60 | 64 |
| 14 | CARDINAL | 4 | 435 | 437 |
| 1,000 | MONEY | 12 | 278 | 283 |
| 250,000 | MONEY | 17 | 273 | 280 |
| ... | ... | ... | ... | ... |
| ... | ... | ... | ... | ... |

FIG. 6B

| field | Type | Value | Frequency | Proximity Score | Lateral Proximity Entity Direction |
|---|---|---|---|---|---|
| issue_date | DATE | 03-May-18 | 2 | 2 | R (Right) |
| issue_date | DATE | 01-Jan-17 | 1 | 24 | L (Left) |
| issue_date | DATE | 01-Jan-19 | 1 | 48 | L |
| maturity_date | DATE | 04-May-23 | 10 | 0.089 | R |
| maturity_date | DATE | 01-May-23 | 5 | 7.845 | L |
| settlement_date | DATE | 03-May-18 | 2 | 2.222 | R |
| trade_date | DATE | 30-Apr-18 | 4 | 0.928 | R |
| trade_date | DATE | 01-May-23 | 4 | 1.938 | R |
| trade_date | DATE | 03-May-18 | 3 | 2.099 | R |
| trade_date | DATE | 04-May-23 | 2 | 3.958 | R |
| issuer | ORG | Financial Organization | 3 | 0.033 | R |
| issuer | ORG | Financial Corporation | 4 | 0.088 | R |
| issuer | ORG | the U.S. Treasury | 4 | 0.098 | R |
| ... | ... | ... | ... | ... | ... |
| ... | ... | ... | ... | ... | ... |

DISCHARGE SUMMARY

Patient Name: Russell Johnson
Age: 72
Medical Record Number: 925

Attending Physician: Dr Gary Marshall

Final Diagnosis: RLL pneumonia, COPD exacerbation, mild CHF, osteoarthritis

Procedures: none

Old thin white male presented to emergency and was admitted on April 1, 2015 with shortness of breath, weakness and dehydration. Chest X-ray showed right lower lobe infiltrate, ABGs unremarkable. Pulse ox on RA was 79%.

1) Pneumonia: treated with ceftriaxone and azithromycin iv. Switched to PO after 72 hours.
2) Exacerbation of COPD: patient treated with inhaled and oral steroids. O2 at 2l/nc. On RA at time of discharge.
3) Weakness and dehydration: secondary to pneumonia and COPD. Responded well to strengthening with PT and regular meals.

Discharge Medications: Zithromycin daily until gone, inhalers 4ef puffs.

Discharge Instructions: Can be discharged on April 5, 2019. No activity restriction, regular diet, follow up in two to three weeks with regular physician.

| Field | Type | Value |
|---|---|---|
| patient_name | NAME | Russell Johnson |
| medical_record_number | CARDINAL | 925 |
| admission_date | DATE | April 1, 2015 |
| discharge_date | DATE | April 5, 2019 |
| attending_physician | NAME | Dr Gary Marshall |
| age | CARDINAL | 72 |

| Entity Value | Type | Frequency | Start Position | End Position |
|---|---|---|---|---|
| Russell Johnson | NAME | 1 | 16 | 30 |
| 72 | CARDINAL | 2 | 6 | 7 |
| 925 | CARDINAL | 3 | 24 | 26 |
| Dr Gary Marshall | NAME | 4 | 20 | 37 |
| April 1, 2015 | DATE | 7 | 60 | 73 |
| 72 hours | TIME | 8 | 84 | 91 |
| April 5, 2019 | DATE | 12 | 50 | 62 |
| two to three weeks | TIME | 12 | 114 | 131 |

| Field | Value | Probability Score | Entity Frequency | Entity Position | Field Position |
|---|---|---|---|---|---|
| | | 0.1 | 1 | | R |
| | | 0.1 | 1 | | L |
| | | 0.1 | 1 | | L |
| | | 0.1 | 1 | | R |
| | | 0.1 | 1 | | L |
| | | 0.1 | 1 | | R |

SYSTEMS AND METHODS FOR DATA EXTRACTION USING PROXIMITY CO-REFERENCING

FIELD OF THE INVENTION

The present invention relates generally to systems and methods for extracting data from electronic documents, including systems and methods for extracting data from unstructured data sources.

BACKGROUND OF THE INVENTION

News organizations and private entities often release articles or statements in the form of electronic documents. These articles or statements sometimes contain valuable information for consumers. For example, a news article may contain information regarding financial market conditions or a transaction between two organizations. Natural language processing can assist in extracting data strings from these electronic documents. However, extracting such information from these articles or statements requires manually reading and interpreting the articles or statements in order to determine the key data elements and their relationships within the articles or statements.

SUMMARY OF THE INVENTION

Accordingly, an object of the invention is to provide systems and methods for extracting data from unstructured data sources. For example, it is an object of the invention to provide systems and methods for extracting data from unstructured data sources based on a proximity co-reference resolution model. It is an object of the invention to provide systems and methods for generating keywords based on fields to be extracted from an electronic document. It is an object of the invention to provide systems and methods for calculating proximity scores for each of the fields based on a proximity co-reference resolution model. It is an object of the invention to provide systems and methods for identifying field-entity pairs for each of the fields based on the calculated proximity scores.

In some aspects, a computerized method for extracting data from unstructured data sources based on a proximity co-reference resolution model includes receiving an electronic document from an unstructured data source. The method further includes extracting entities from the electronic document. For example, in some embodiments, the entities are extracted from the electronic document using a named-entity recognition (NER) platform. The method also includes receiving fields to be extracted from the electronic document. Each of the entities is associated with at least one of the fields. For example, in some embodiments, the fields are received based on a user input at a user device. The method further includes generating keywords based on the received fields. For example, in some embodiments the generated keywords includes one of a word or a phrase. In some embodiments, the generated keywords are validated based on a user input at the user device.

Further, the method includes identifying keywords in the electronic document based on the generated keywords. The method also includes, for each of the received fields, calculating proximity scores based on a proximity co-reference resolution model. For example, in some embodiments, the proximity co-reference resolution model is based on a number of words between an extracted entity and an identified keyword. In some embodiments, the proximity co-reference resolution model is based on a frequency of an extracted entity proximate at least one of the identified keywords. The method further includes, for each of the received fields, identifying a field-entity pair based on the calculated proximity scores. The method also includes generating for display on the user device the field-entity pair for each of the received fields.

In some embodiments, the method also includes receiving at least one promoter keyword and at least one distractor keyword. For example, in some embodiments, the proximity co-reference resolution model is based on a frequency of the at least one promoter keyword proximate at least one of the entities. In some embodiments, the proximity co-reference resolution model is based on a frequency of the at least one distractor keyword proximate at least one of the entities.

In some aspects, a system for extracting data from unstructured data sources based on a proximity co-reference resolution model includes a server computing device communicatively coupled to a database and a user device over a network. The server computing device is configured to receive an electronic document from an unstructured data source. The server computing device is also configured to extract entities from the electronic document. For example, in some embodiments, the server computing device is further configured to extract the entities from the electronic document using a named-entity recognition (NER) platform. Further, the server computing device is configured to receive fields to be extracted from the electronic document. For example, in some embodiments, the server computing device is further configured to receive the fields based on a user input at the user device. Each of the extracted entities is associated with at least one of the received fields.

The server computing device is also configured to generate keywords based on the received fields. For example, in some embodiments, the generated keywords include one of a word or a phrase. In some embodiments, the server computing device is further configured to validate the generated keywords based on a user input at the user device. Further, the server computing device is configured to identify keywords in the electronic document based on the received keywords. The server computing device is also configured to, for each of the received fields, calculate proximity scores based on a proximity co-reference resolution model. For example, in some embodiments, the proximity co-reference resolution model is based on a number of words between an extracted entity and an identified keyword. In some embodiments, the proximity co-reference resolution model is based on a frequency of an extracted entity proximate at least one of the identified keywords. Further, the server computing device is configured to, for each of the received fields, identify a field-entity pair based on the calculated proximity scores. The server computing device is also configured to generate for display on the user device the field-entity pair for each of the received fields.

In some embodiments, the server computing device is further configured to receive at least one promoter keyword and at least one distractor keyword. For example, in some embodiments, the proximity co-reference resolution model is based on a frequency of the at least one promoter keyword proximate at least one of the extracted entities. In some embodiments, the proximity co-reference resolution model is based on a frequency of the at least one distractor keyword proximate at least one of the entities.

Other aspects and advantages of the invention can become apparent from the following drawings and description, all of which illustrate the principles of the invention, by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION OF THE INVENTION

The systems and methods described herein can enable an integrated platform that extracts data from unstructured data sources. For example, in some aspects, the systems and methods described herein can include one or more mechanisms or methods for extracting data from unstructured data sources based on a proximity co-reference resolution model. The system and methods can include mechanisms or methods for generating keywords based on fields to be extracted from an electronic document. The systems and methods described herein can provide mechanisms or methods for calculating proximity scores for each of the fields based on a proximity co-reference resolution model. The systems and methods described herein can provide mechanisms or methods for identifying field-entity pairs for each of the fields based on the calculated proximity scores.

Figure 1:
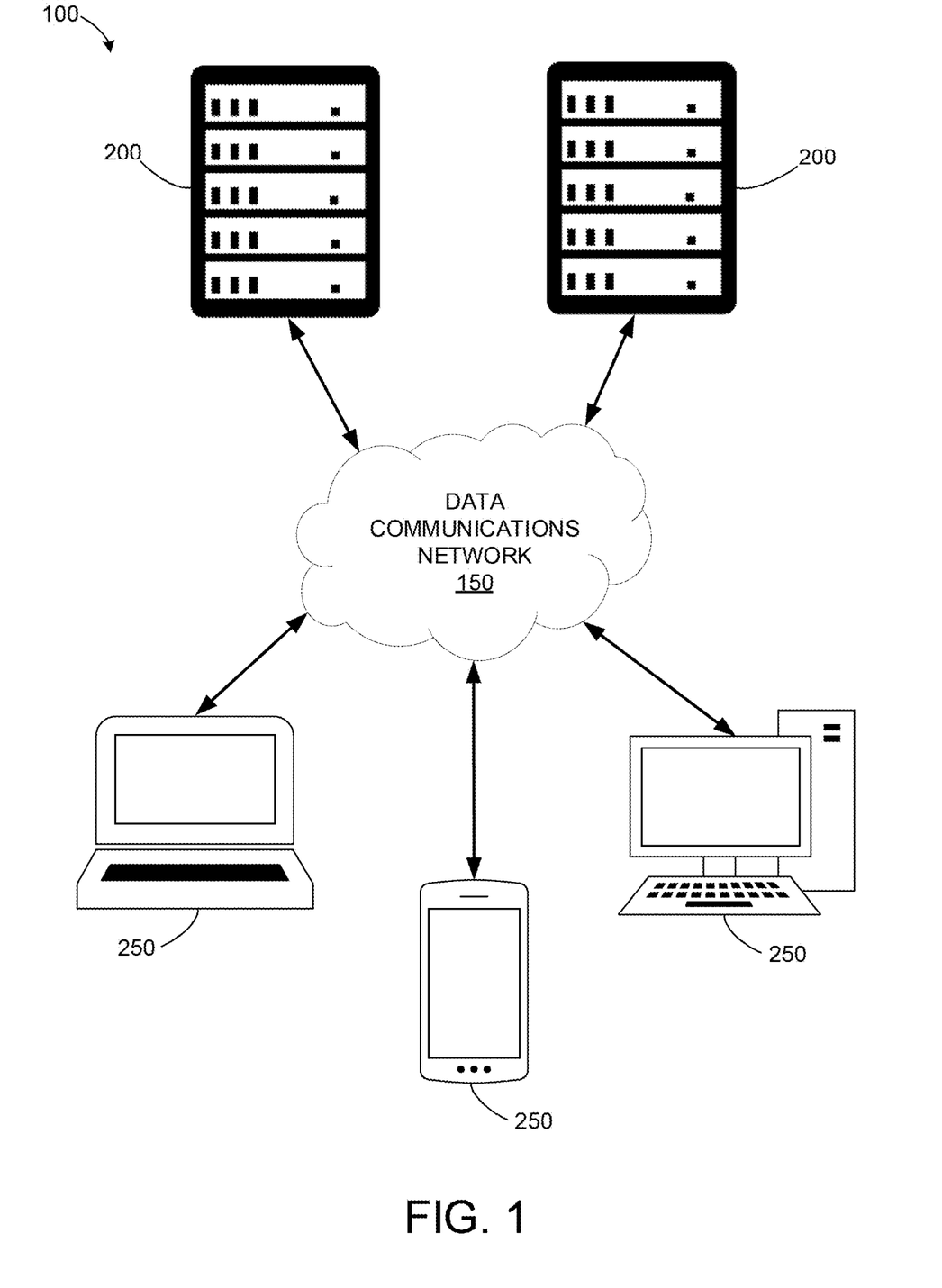
FIG. 1 is a block diagram of an exemplary data communications network, according to embodiments of the technology described herein.
Figure 2:
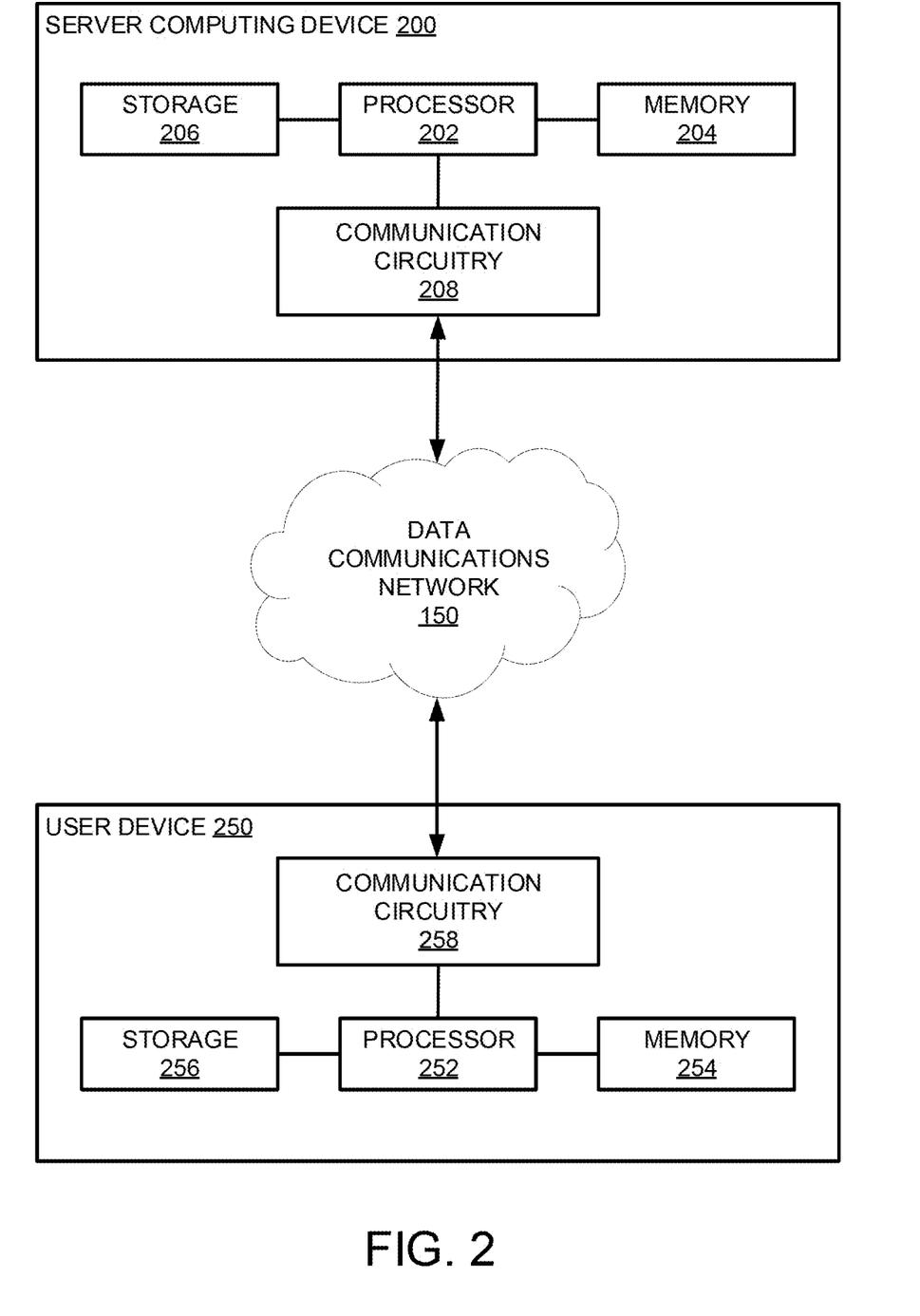
FIG. 2 is a block diagram of an exemplary server computing device and an exemplary user device, according to embodiments of the technology described herein.

The systems and methods described herein can be implemented using a data communications network, server computing devices, and mobile devices. For example, referring to FIGS. 1 and 2, an exemplary communications system 100 includes data communications network 150, exemplary server computing devices 200, and exemplary user devices 250. In some embodiments, the system 100 includes one or more server computing devices 200 and one or more user devices 250. Each server computing device 200 can include a processor 202, memory 204, storage 206, and communication circuitry 208. Each user device 250 can include a processor 252, memory 254, storage 256, and communication circuitry 258. In some embodiments, communication circuitry 208 of the server computing devices 200 is communicatively coupled to the communication circuitry 258 of the user devices 250 via data communications network 150. Communication circuitry 208 and communication circuitry 258 can use Bluetooth, Wi-Fi, or any comparable data transfer connection. The user devices 250 can include personal workstations, laptops, tablets, mobile devices, or any other comparable device.

The systems and methods described herein allow for the tagging of extracted named entities from electronic documents to desired fields. For example, referring to FIG. 3, an architecture 300 is illustrated. Architecture 300 includes bulk electronic documents 310, electronic document 320, and natural language processor (NLP) 350. NLP 350 includes NLP library 360 and proximity co-reference resolution model 400. Proximity co-reference resolution model 400 is described further below in relation to FIG. 4. The elements of architecture 300 can be implemented using communications system 100.

Figure 3:
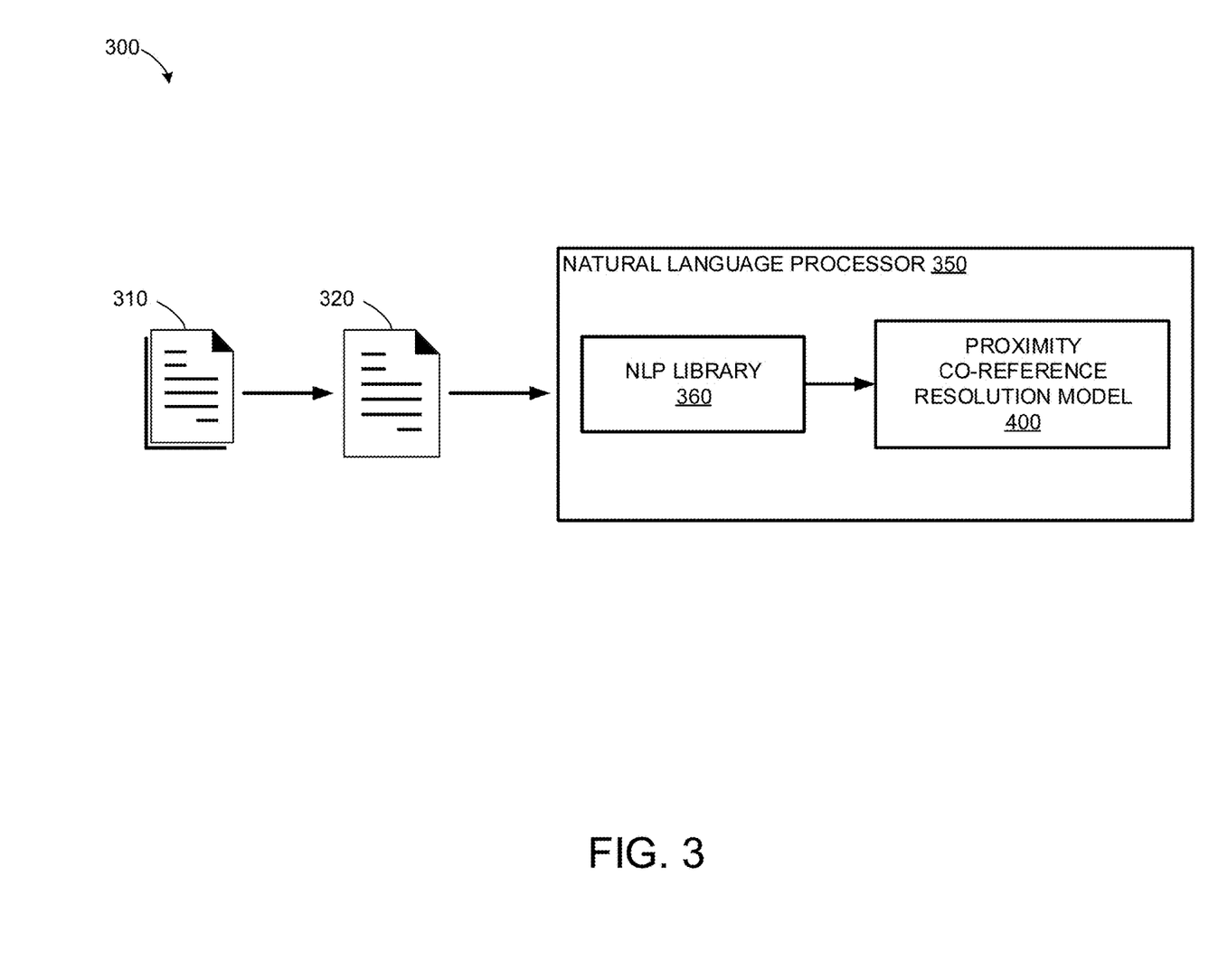
FIG. 3 is a diagram of an architecture for extracting data from unstructured sources based on a proximity co-reference resolution model, according to embodiments of the technology described herein.

NLP 350 is configured to receive at least one electronic document 320 and extract one or more data strings from the electronic document 320. In some embodiments, electronic document 320 is a portable document format (PDF) or in HTML format. For example, in some embodiments, the electronic document 320 includes an article or a statement by an organization related to a transaction. In some embodiments, NLP library 360 can be implemented using open source language models. For example, in some embodiments, NLP library 360 can be implemented using at least one of spaCy, OpenNLP, and GATE.

NLP 350 is also configured to receive a user input of fields to be extracted from the electronic document 320. For example, in some embodiments, NLP 350 is configured to receive a user input from user device 250. The fields to be extracted correspond to key data elements contained in the electronic document 320. For example, in some embodiments, for a financial document, the fields to be extracted can include a trade date, a settlement date, a maturity date, or other related quantity or date. NLP 350 is also configured to generate keywords that can be used to uniquely identify the fields. In some embodiments, the generated keywords can include relevant synonyms and/or varied tenses which create an exhaustive list of possible keywords corresponding to the fields. For example, if the field to be extracted is "Maturity Date," generated keywords can include "Maturity Date," "Maturing on," "to be matured on," among others. In some embodiments, the generated keywords can be validated by a user via a user input at a user device 250. For example, in some embodiments, a user can remove and/or add keywords to the list of generated keywords via a user input at a user device 250.

Figure 4:
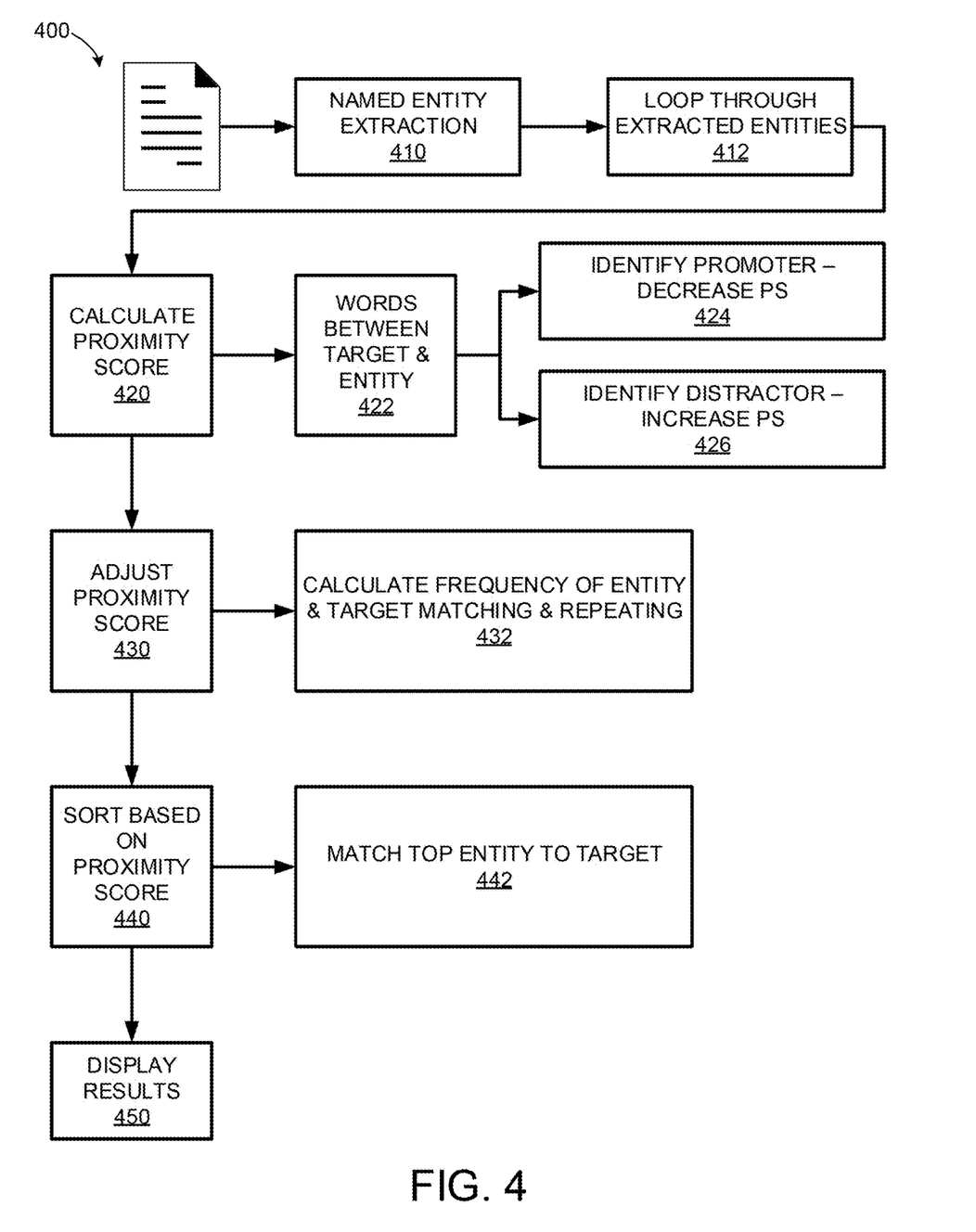
FIG. 4 is a flow diagram of a computer-implemented proximity co-reference resolution model, according to embodiments of the technology described herein.
Figure 5A:
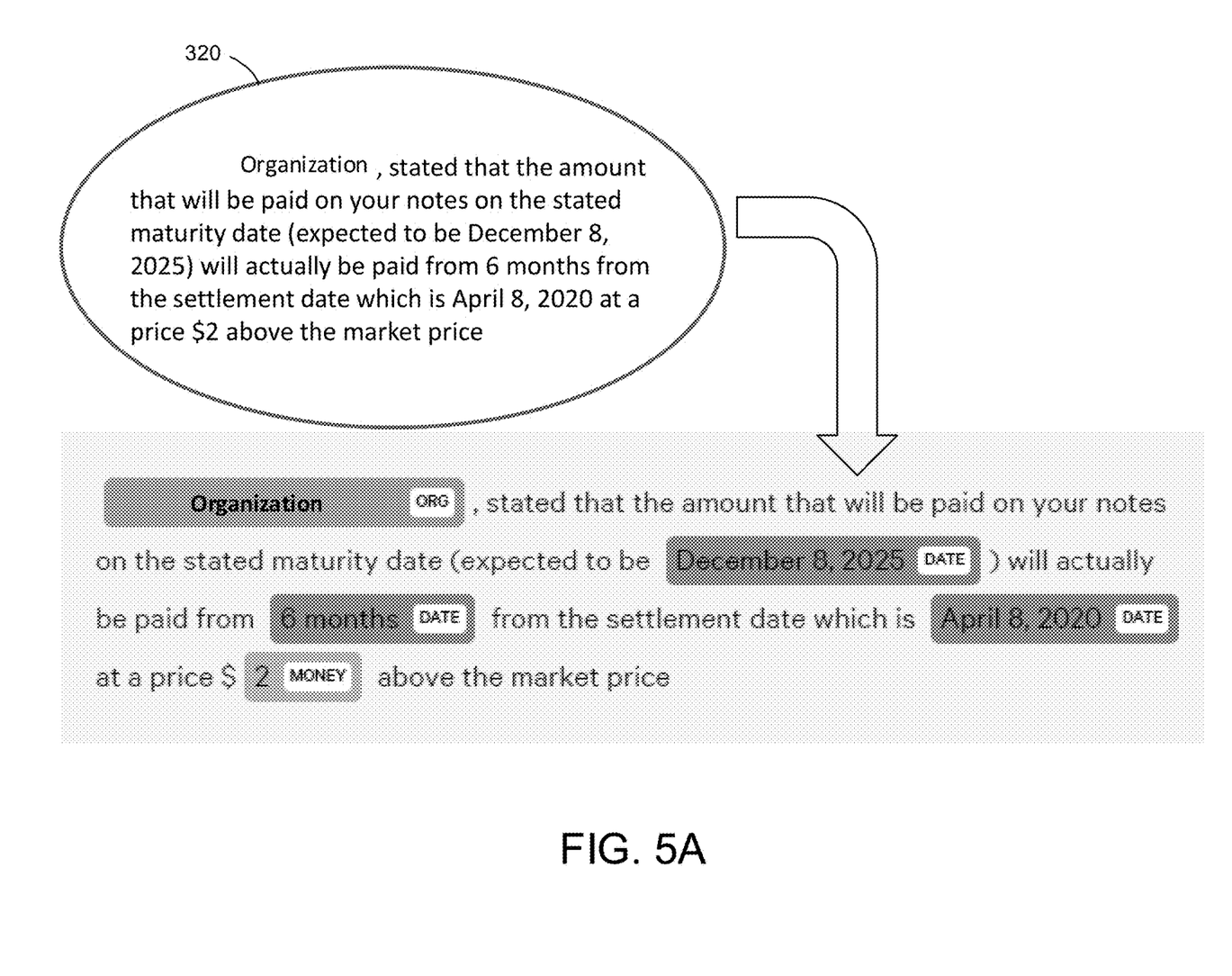
FIG. 5A is a diagram showing a visualization of named entity recognition of an exemplary electronic document, according to embodiments of the technology described herein.

Once the fields to be extracted are received and the keywords are generated, architecture 300 proceeds to apply proximity co-reference resolution model 400. Referring to FIG. 4, a proximity co-reference resolution model 400 is illustrated. Model 400 is can be used to capture target fields from unstructured data sources and performs co-referencing in order to avoid relying on large training datasets. Model 400 takes the domain knowledge in the form of synonymous configuration into account and works with mathematical functions to efficiently identify the domain context around the named entity. For example, model 400 begins by extracting named entities from an electronic document 320 at step 410. In some embodiments, model 400 relies on NLP library 360 to extract named entities from the electronic document 320. In other embodiments, the named entities are recognized in the electronic document 320 by a Deep Learning Model. For example, as shown in FIG. 5A, model 400 can extract entities from an electronic document 320, such as the name of an organization, dates, and quantities.

Model 400 then loops through extracted entities at step 412 in order to calculate proximity scores for each set of fields and entities in the electronic document 320 at step 420. Model 400 calculates the proximity score by determining the distance measured by the number of words between each set of keyword-entity combinations for the field to be extracted from the left and right directions at step 422. Model 400 then identifies one or more promoter words and decreases the proximity score at step 424. Promoters are keywords or phrases which support the relation between the keyword and the entity value. For example, the keyword "Original" can be a promoter word for "Maturity Date" if extracting the maturity date field. Model 400 also identifies one or more distractor words and increases the proximity score at step 426. Distractors are keywords or phrases which decrease the chances of a relation between the keyword and entity value pair.

Model 400 then adjusts the proximity score at step 430 by calculating the number of times the entity and target match and repeat throughout the electronic document 320 at step 432. For example, if a particular entity is around or proximate the relevant keywords multiple times, the probability that the entity is the right value for the field to be extracted increases, resulting in a smaller proximity score for that particular entity-field pair. The following pseudo code illustrates exemplary computing operations for calculating and adjusting proximity scores:

```
function proximityScore(keyword, entity){
    PS=no. of words between keyword & entity
    if (promoter found for keyword){
        p=distance between promoter and keyword
        p*=no. of promoters found near keyword
```

$$PS = PS - \sum_{n=1}^{n=p^*} \left(\frac{1}{p}\right)$$

```
    }
    if (distractor found for keyword){
        q=distance between distractor and keyword
        q*=no. of distractors found near keyword
```

$$PS = PS + \sum_{n=1}^{n=q^*} \left(\frac{1}{q}\right)$$

```
    }
}
function finalProximityScore(dataset){
    for each target in dataset{
        RPS=reduced proximity score
        k=no. of times a value is repeated for a target field in
            the dataset
```

$$\left(\frac{1}{RPS}\right) = \sum_{n=1}^{n=k} \left(\frac{1}{PS}\right)$$

```
    }
}
```

Figure 5B:
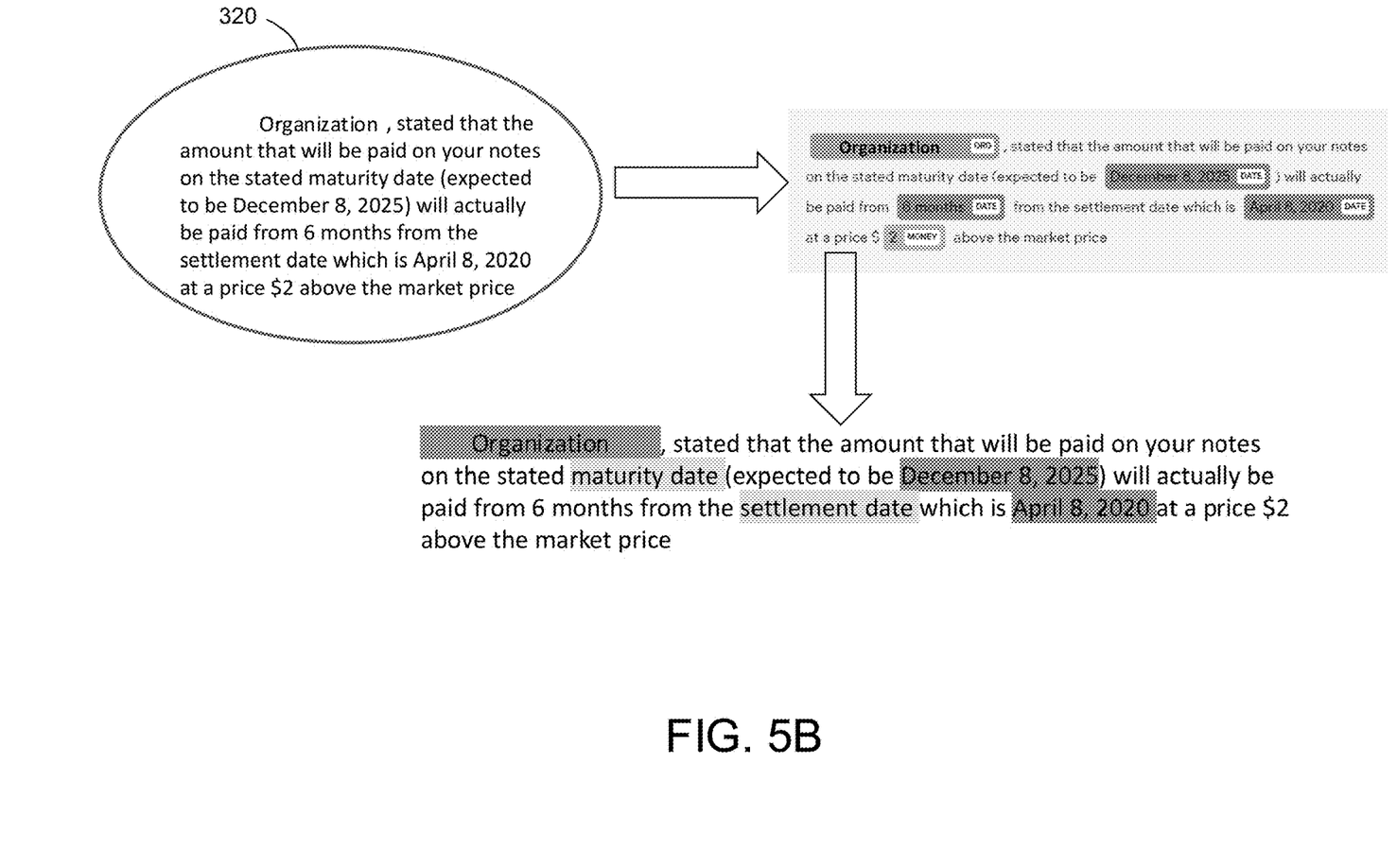
FIG. 5B is a diagram showing a visualization of proximity co-referencing of an exemplary electronic document, according to embodiments of the technology described herein.

Returning to model 400, once the proximity score has been calculated and adjusted, model 400 then sorts the entities based on proximity score at step 440 and matches the topmost entity to the target at step 442. The proximity scores are sorted in increasing order to provide the most probably value for each field. Finally, model 400 displays the results at step 450. For example, as shown in FIG. 5B, model 400 can identify the entity-field pairs with the smallest proximity scores. In the shown example, model 400 tags the "maturity date" field with the "Dec. 8, 2025" entity, and tags the "settlement date" field with the "Apr. 8, 2020" entity.

Figure 6A:
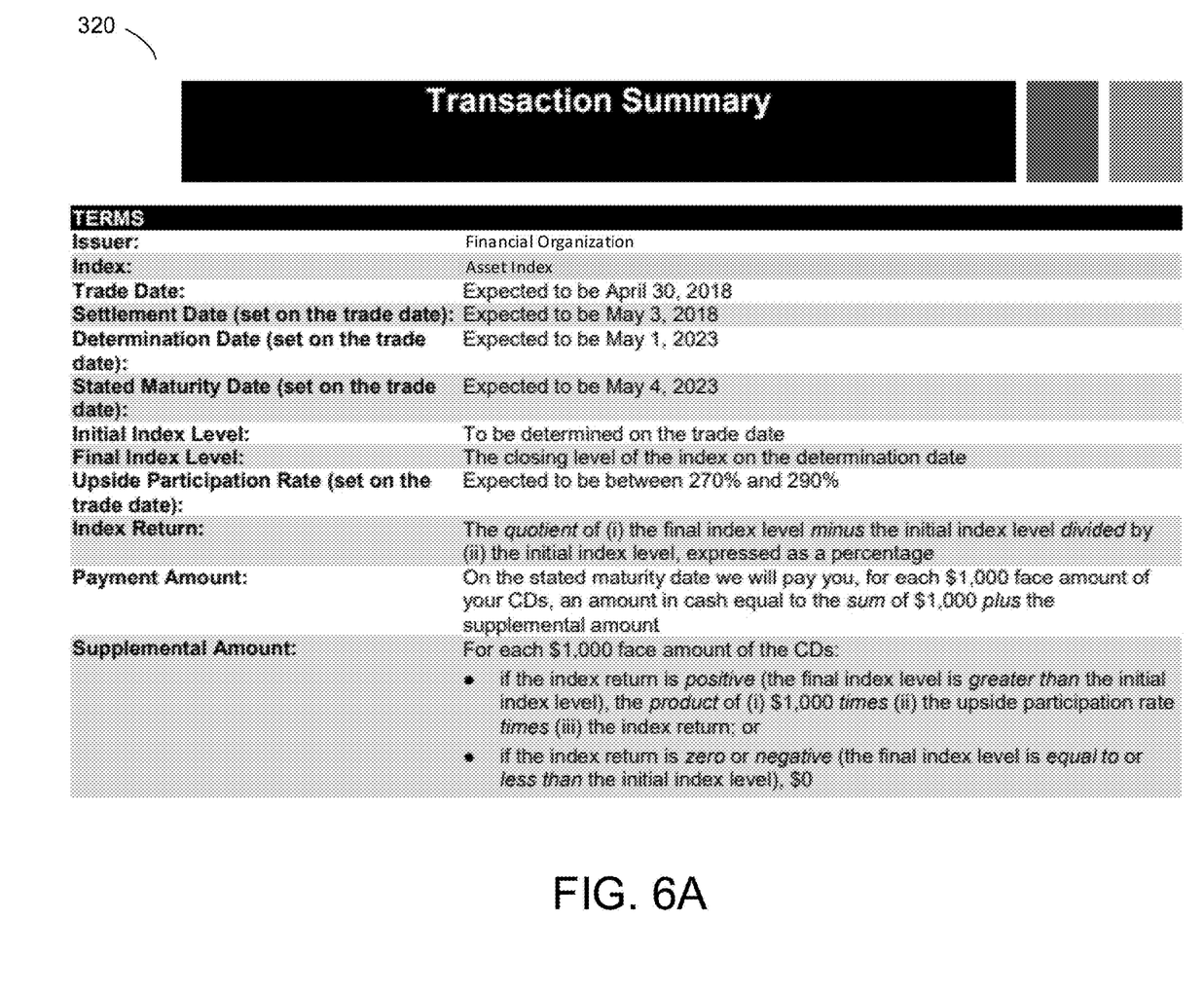
FIG. 6A is a diagram showing a visualization of an exemplary case study using the architecture shown in FIG. 3, according to embodiments of the technology described herein.
Figure 6B:
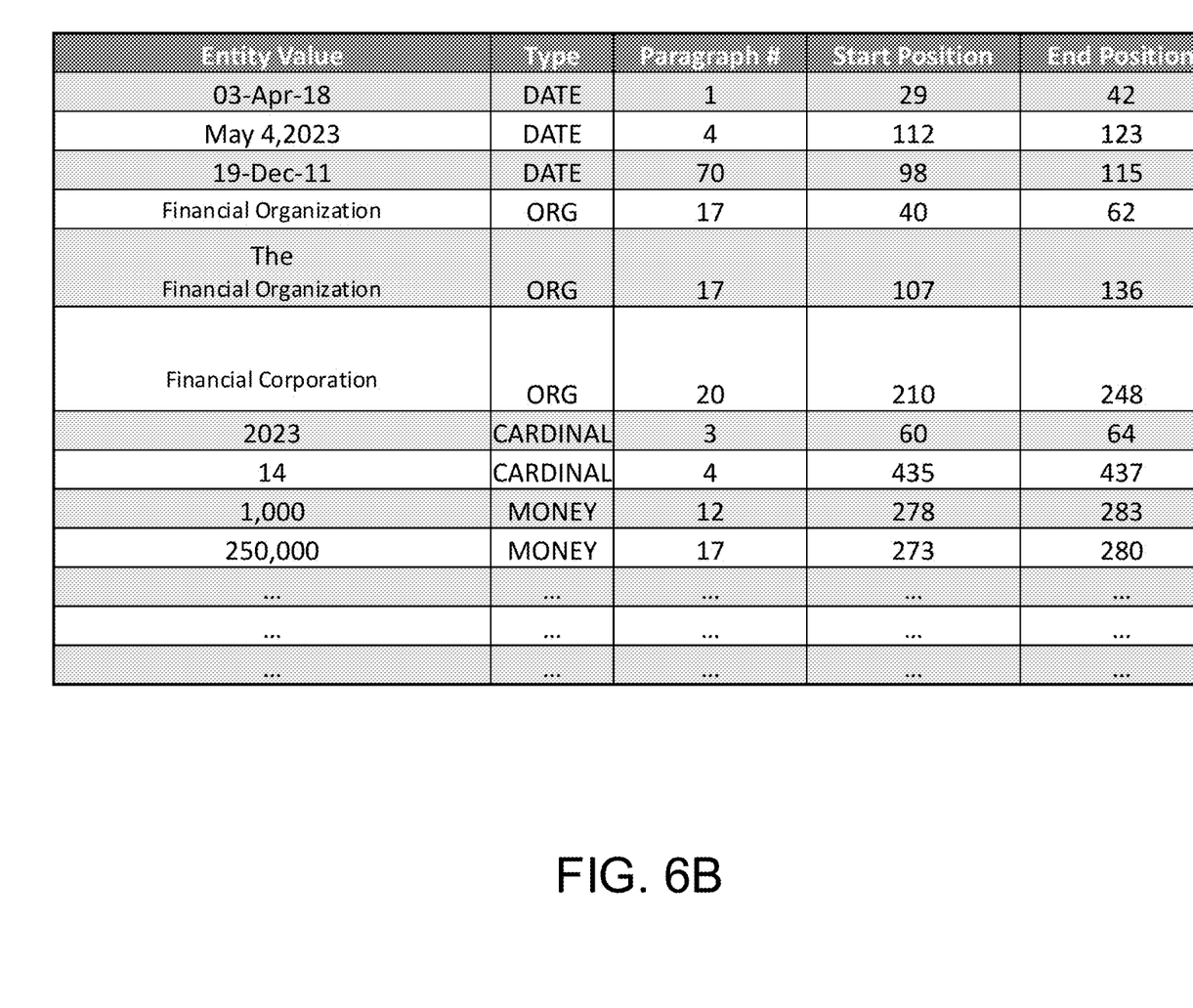
FIG. 6B is a diagram showing a visualization of entities recognized from the exemplary case study shown in FIG. 6A, according to embodiments of the technology described herein.
Figure 6C:
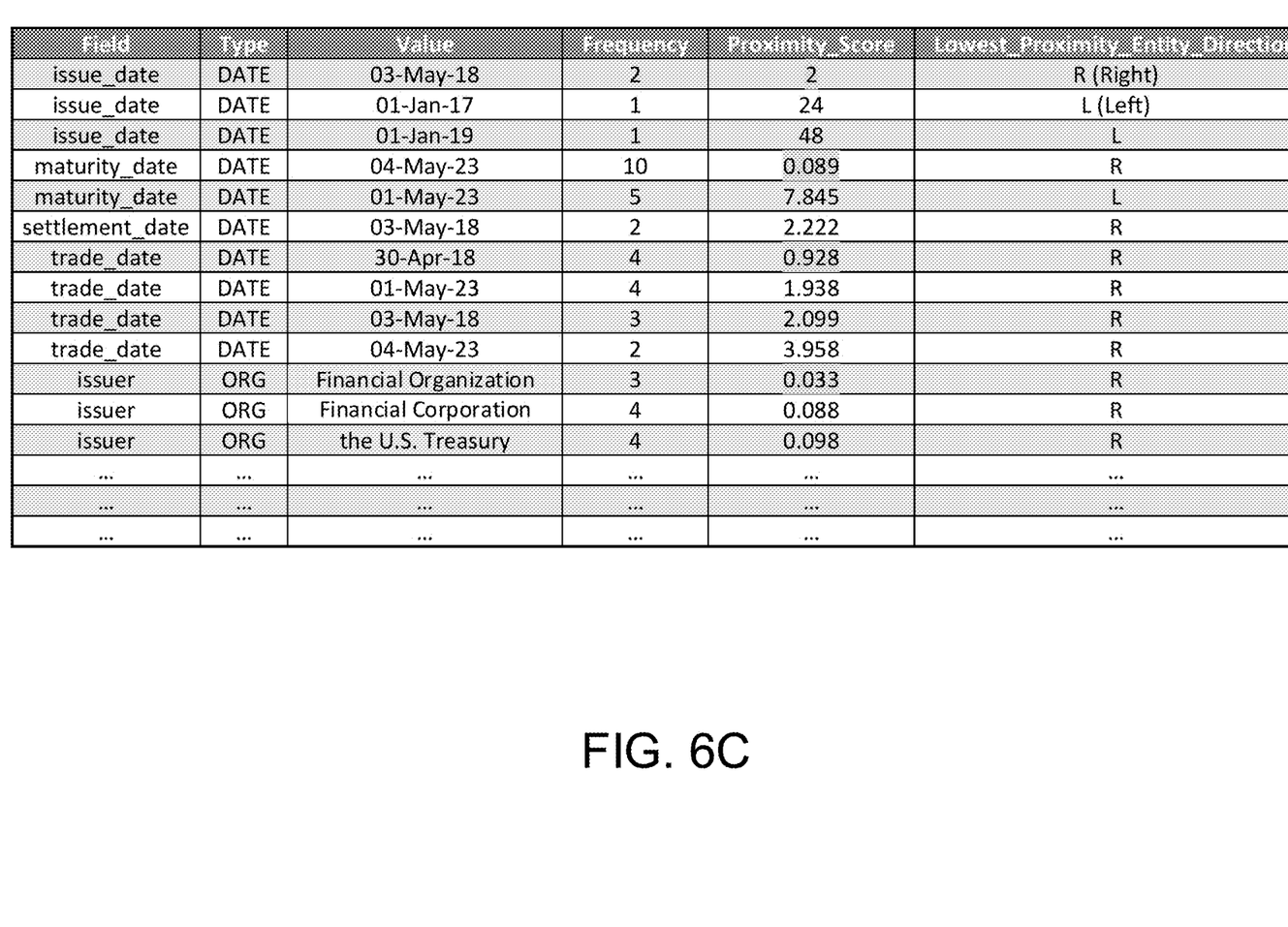
FIG. 6C is a diagram showing a visualization of calculated proximity scores for the exemplary case study shown in FIG. 6A, according to embodiments of the technology described herein.
Figure 7:
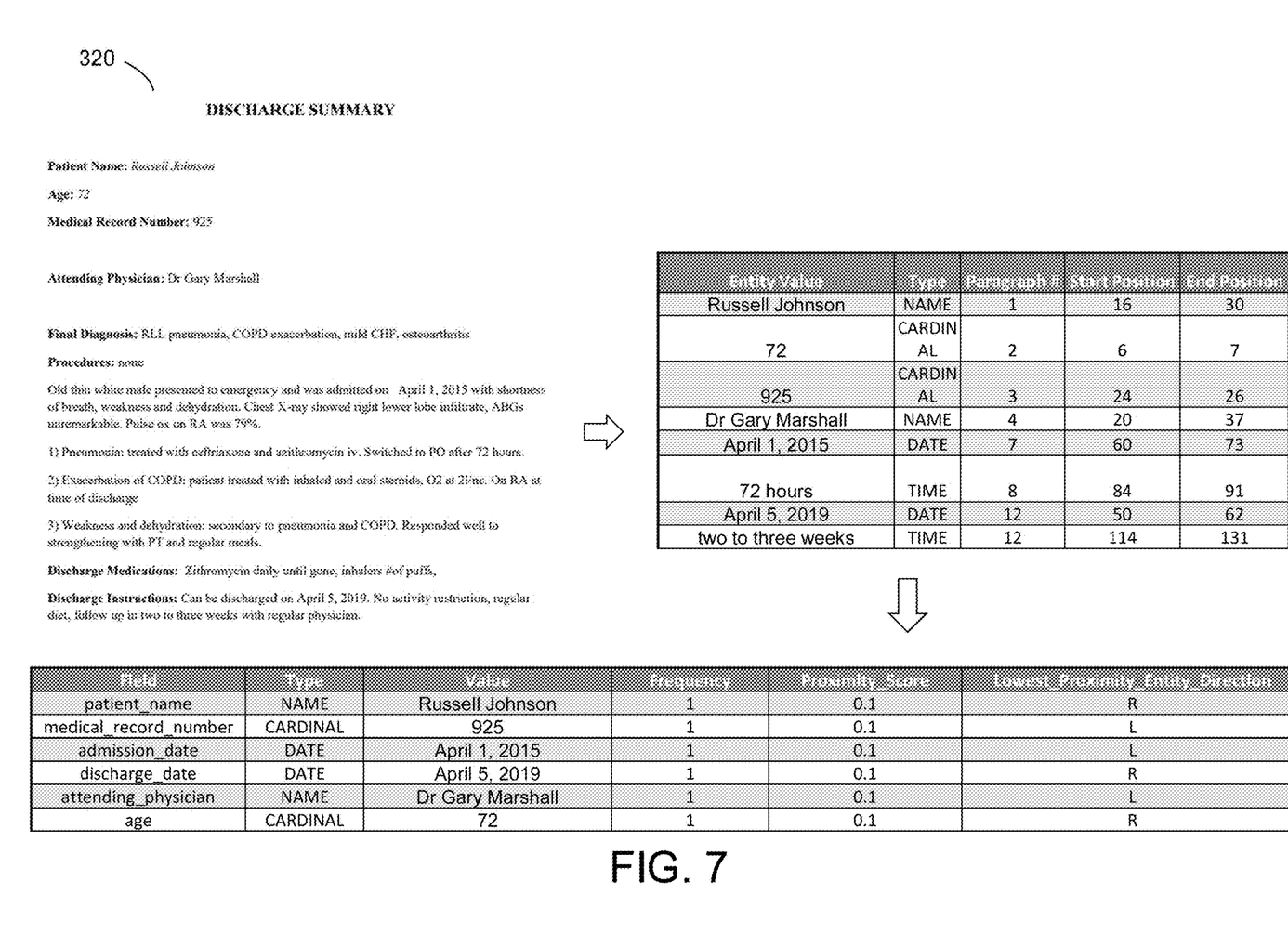
FIG. 7 is a diagram showing a visualization of an exemplary case study using the architecture shown in FIG. 3, according to embodiments of the technology described herein.

Referring to FIGS. 6 and 7, exemplary case studies using architecture 300 and model 400 are illustrated. For example, FIG. 6A illustrates a visualization of an exemplary electronic document 320 containing key data elements corresponding to a financial transaction. FIG. 6B illustrates the extracted entity values, and their respective type and location within the electronic document 320. FIG. 6C illustrates the results of co-reference resolution model 400, with field-entity pairs sorted by proximity scores. Model 400 identifies the field-entity pairs with the lowest proximity scores. Similarly, FIG. 7 illustrates a visualization of an exemplary electronic document 320 containing key data elements corresponding to medical records of a patient. The extracted entity values and calculated proximity scores corresponding to the electronic document 320 are also illustrated.

Figure 8:
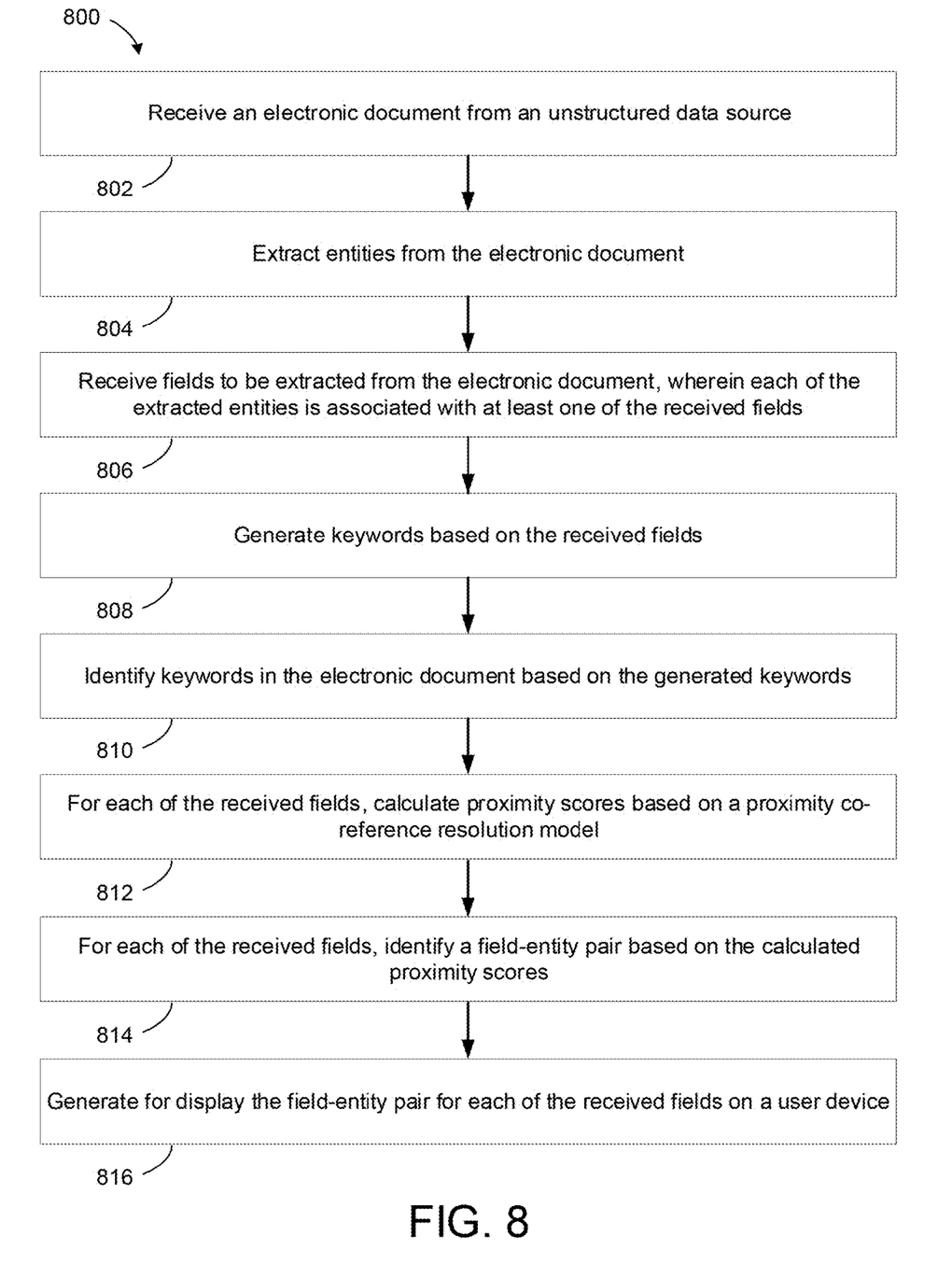
FIG. 8 is a flow diagram of a computer-implemented method for extracting data from unstructured sources based on a proximity co-reference resolution model, according to embodiments of the technology described herein.

Referring to FIG. 8, a process 800 for extracting data from unstructured data sources based on a co-reference resolution model 400 using communications system 100 is illustrated. The process 800 begins by receiving, by a server computing device 200, an electronic document 320 from an unstructured data source in step 802. Process 800 continues by extracting, by the server computing device 200, entities from the electronic document 320 in step 804. For example, in some embodiments, the server computing device 200 is configured to extract the entities from the electronic document 320 using a named-entity recognition (NER) platform.

Process 800 continues by receiving, by the server computing device 200, fields to be extracted from the electronic document 320 in step 806. Each of the entities is associated with at least one of the received fields. For example, in some embodiments, the server computing device 200 is configured to receive the fields based on a user input at a user device 250. Process 800 continues by generating, by the server computing device 200, keywords based on the received fields in step 808. For example, in some embodiments, each of the generated keywords includes one of a word or a phrase. In some embodiments, the server computing device 200 is configured to validate the keywords based on a user input at the user device 250. Process 800 continues by identifying, by the server computing device 200, keywords in the electronic document 320 based on the generated keywords in step 810.

Process 800 continues by, for each of the received fields, calculating, by the server computing device 200, proximity scores based on a proximity co-reference resolution model 400 in step 812. For example, in some embodiments, the proximity co-reference resolution model 400 is based on a number of words between an extracted entity and an identified keyword. In other embodiments, the proximity co-reference model 400 is based on a frequency of an extracted entity proximate at least one of the identified keywords. In some embodiments, the server computing device 200 is configured to receive at least one promoter keyword and at least one distractor keyword. For example, in some embodiments, the proximity co-reference resolution model 400 is based on a frequency of the at least one promoter keyword proximate at least one of the entities. In other embodiments, the proximity co-reference resolution model 400 is based on a frequency of the at least one distractor keyword proximate at least one of the entities.

Process 800 continues by, for each of the received fields, identifying, by the server computing device 200, a field-entity pair based on the calculated proximity scores in step 814. Process 800 finishes by generating, by the server computing device 200, for display on a user device 250 the field-entity pair for each of the received fields in step 816.

In some aspects, process 800 can be implemented on a system for extracting data from unstructured data sources based on a proximity co-reference resolution model 400. The system includes a server computing device 200 communicatively coupled to a user device 250 and a database over a network 150. The server computing device 200 is configured to receive an electronic document 320 from an unstructured data source. The server computing device 200 is also configured to extract entities from the electronic document 320. For example, in some embodiments, the server computing device 200 is further configured to extract the entities from the electronic document 320 using a named-entity recognition (NER) platform.

Further, the server computing device 200 is configured to receive fields to be extracted from the electronic document 320. Each of the extracted entities is associated with at least one of the received fields. For example, in some embodiments, the server computing device 200 is further configured to receive the fields based on a user input at the user device 250. The server computing device 200 is also configured to generate keywords based on the received fields. For example, in some embodiments, the generated keywords include one of a word or a phrase. In some embodiments, the server computing device 200 is further configured to validate the generated keywords based on a user input at the user device 250. Further, the server computing device 200 is configured to identify keywords in the electronic document 320 based on the generated keywords.

The server computing device 200 is also configured to, for each of the received fields, calculate proximity scores based on a proximity co-reference resolution model 400. For example, in some embodiments, the proximity co-reference resolution model 400 is based on a number of words between an extracted entity and an identified keyword. In other embodiments, the proximity co-reference resolution model 400 is based on a frequency of an extracted entity proximate at least one of the identified keywords. Further, the server computing device 200 is configured to, for each of the received fields, identify a field-entity pair based on the proximity scores. The server computing device 200 is further configured to generate for display the field-entity pair for each of the received fields on a user device 250.

In some embodiments, the server computing device 200 is further configured to receive at least one promoter keyword and at least one distractor keyword. For example, in some embodiments, the proximity co-reference resolution model 400 is based on a frequency of the at least one promoter keyword proximate at least one of the extracted entities. In other embodiments, the proximity co-reference resolution model 400 is based on a frequency of the at least one distractor keyword proximate at least one of the extracted entities.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

The above-described techniques can be implemented using supervised learning and/or machine learning algorithms. Supervised learning is the machine learning task of learning a function that maps an input to an output based on example input-output pairs. It infers a function from labeled training data consisting of a set of training examples. Each example is a pair consisting of an input object and a desired output value. A supervised learning algorithm or machine learning algorithm analyzes the training data and produces an inferred function, which can be used for mapping new examples.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed:

1. A computerized method for extracting data from unstructured data sources based on a proximity co-reference resolution model, the method comprising:

extracting, by the server computing device, a plurality of entities from an electronic document received from an unstructured data source;

generating, by the server computing device, a plurality of keywords based on a plurality of fields to be extracted from the electronic document, wherein each of the plurality of entities is associated with at least one of the plurality of fields;

adding, by the server computing device, at least one additional keyword to the generated plurality of keywords based upon a first user input;

identifying, by the server computing device, a plurality of identified keywords in the electronic document based on the plurality of keywords;

for each of the plurality of fields, calculating, by the server computing device, a plurality of proximity scores by applying a proximity co-reference resolution deep learning model executed using a natural language processor, comprising:

i) determining a distance between a keyword and an entity in the electronic document and generating a proximity score for a field-entity combination based upon the distance, ii) identifying one or more promoter words in the electronic document between the keyword and the entity and decreasing the proximity score for the field-entity combination based upon the identified promoter words, iii) identifying one or more distractor words in the electronic document between the keyword and the entity and increasing the proximity score for the field-entity combination based upon the identified distractor words, and iv) adjusting the proximity score for the field-entity combination based upon a frequency of the keyword and the entity in proximity to each other in the electronic document;

for each of the plurality of fields, assigning, by the server computing device, the entity and the field to a field-entity pair based on the plurality of proximity scores; and generating, by the server computing device, for display on a user device the field-entity pair for each of the plurality of fields.

2. The computerized method of claim 1, wherein the server computing device is further configured to extract the plurality of entities from the electronic document using a named-entity recognition (NER) platform.

3. The computerized method of claim 1, wherein the server computing device is further configured to receive the plurality of fields based on a second user input at the user device.

4. The computerized method of claim 3, wherein the server computing device is further configured to validate the plurality of keywords based on a third user input at the user device.

5. The computerized method of claim 1, wherein each of the plurality of keywords comprises one of a word or a phrase.

6. The method of claim 1, wherein decreasing the proximity score for the field-entity combination based upon the identified promoter words comprises the algorithm:

$$PS = PS - \sum_{n=1}^{n=p^*} \left(\frac{1}{p}\right)$$

where PS is a number of words between the keyword and the entity, p is the distance between the keyword and a promoter word, and p* is a number of promoters found near the keyword.

7. The method of claim 1, wherein increasing the proximity score for the field-entity combination based upon the identified detractor words comprises the algorithm:

$$PS = PS + \sum_{n=1}^{n=q^*} \left(\frac{1}{q}\right)$$

where PS is a number of words between the keyword and the entity, q is the distance between the keyword and a detractor word, and q* is a number of detractors found near the keyword.

8. A system for extracting data from unstructured data sources based on a proximity co-reference resolution model, the system comprising:

a server computing device communicatively coupled to a user device and a database over a network, the server computing device configured to:

extract a plurality of entities from an electronic document received from an unstructured data source;

generate a plurality of keywords based on a plurality of fields to be extracted from the electronic document, wherein each of the plurality of entities is associated with at least one of the plurality of fields;

add at least one additional keyword to the generated plurality of keywords based upon a first user input;

identify a plurality of identified keywords in the electronic document based on the plurality of keywords;

for each of the plurality of fields, calculate a plurality of proximity scores by applying a proximity co-reference resolution deep learning model executed using a natural language processor, comprising:

i) determining a distance between a keyword and an entity in the electronic document and generating a proximity score for a field-entity combination based upon the distance, ii) identifying one or more promoter words in the electronic document between the keyword and the entity and decreasing the proximity score for the field-entity combination based upon the identified promoter words, iii) identifying one or more distractor words in the electronic document between the keyword and the entity and increasing the proximity score for the field-entity combination based upon the identified distractor words, and iv) adjusting the proximity score for the field-entity combination based upon a frequency of the keyword and the entity in proximity to each other in the electronic document;

for each of the plurality of fields, assign the entity and the field to a field-entity pair based on the plurality of proximity scores; and generate for display on the user device the field-entity pair for each of the plurality of fields.

9. The system of claim 8, wherein the server computing device is further configured to extract the plurality of entities from the electronic document using a named-entity recognition (NER) platform.

10. The system of claim 8, wherein the server computing device is further configured to receive the plurality of fields based on a second user input at the user device.

11. The system of claim 10, wherein the server computing device is further configured to validate the plurality of keywords based on a third user input at the user device.

12. The system of claim 8, wherein each of the plurality of keywords comprises one of a word or a phrase.

13. The system of claim 8, wherein decreasing the proximity score for the field-entity combination based upon the identified promoter words comprises the algorithm:

$$PS = PS - \sum_{n=1}^{n=p^*} \left(\frac{1}{p}\right)$$

where PS is a number of words between the keyword and the entity, p is the distance between the keyword and a promoter word, and p* is a number of promoters found near the keyword.

14. The system of claim 8, wherein increasing the proximity score for the field-entity combination based upon the identified detractor words comprises the algorithm:

$$PS = PS + \sum_{n=1}^{n=q^*} \left(\frac{1}{q}\right)$$

where PS is a number of words between the keyword and the entity, q is the distance between the keyword and a detractor word, and q* is a number of detractors found near the keyword.

* * * * *